US007949751B1

(12) United States Patent
Potter et al.

(10) Patent No.: US 7,949,751 B1
(45) Date of Patent: May 24, 2011

(54) METHOD FOR A NETWORK DEVICE TO DESCRIBE ITSELF AND THE SERVICES IT REQUIRES TO A AAA SERVER

(75) Inventors: Darran Potter, Kent (GB); John Zamick, Somerset (GB); Andrew Clymer, Wiltshire (GB)

(73) Assignee: Cisco Technology, Inc., San Jose, CA (US)

( * ) Notice: Subject to any disclaimer, the term of this patent is extended or adjusted under 35 U.S.C. 154(b) by 1245 days.

(21) Appl. No.: 10/691,994

(22) Filed: Oct. 22, 2003

(51) Int. Cl.
*G06F 15/173* (2006.01)
*G06F 15/16* (2006.01)
*G06F 15/177* (2006.01)

(52) U.S. Cl. .......................... 709/226; 709/217; 709/220

(58) Field of Classification Search .......... 709/223–224, 709/226, 217, 219, 220
See application file for complete search history.

(56) References Cited

U.S. PATENT DOCUMENTS

| | | | | |
|---|---|---|---|---|
| 6,301,618 | B1 * | 10/2001 | Sitaraman et al. | 709/227 |
| 6,345,279 | B1 * | 2/2002 | Li et al. | 707/104.1 |
| 6,421,733 | B1 * | 7/2002 | Tso et al. | 709/246 |
| 6,628,671 | B1 * | 9/2003 | Dynarski et al. | 370/469 |
| 6,643,704 | B1 * | 11/2003 | Timms et al. | 709/239 |
| 6,845,393 | B1 * | 1/2005 | Murphy et al. | 709/220 |
| 6,854,014 | B1 * | 2/2005 | Amin et al. | 709/227 |
| 7,089,316 | B2 * | 8/2006 | Andersen et al. | 709/229 |
| 7,277,942 | B2 * | 10/2007 | Inoue et al. | 709/225 |
| 7,506,069 | B2 * | 3/2009 | Pfitzner | 709/246 |

OTHER PUBLICATIONS

Cisco Systems, Inc., "Cisco Secure ACS 3.0 for Windows 2000/NT Servers User Guide," Nov. 2001, 26 pages.

C. Rigney, "RADIUS Accounting," Jun. 2000, Network Working Group, Request for Comments: 2866, pp. 1-28.

Cisco Systems, Inc., "Other Features Enabled by System Distribution," Chapter 4, Setting Up and Managing Network Configuration, pp. 4-8-4-15.

C. Rigney, et al., "Remote Authentication Dial in User Service (RADIUS)," Jun. 2000, Network Working Group, Request for Comments: 2865, pp. 1-76.

* cited by examiner

*Primary Examiner* — Hussein A Elchanti
(74) *Attorney, Agent, or Firm* — Hickman Palermo Truong & Becker LLP

(57) ABSTRACT

The invention relates to a method for requesting access to services across a computer network, preferably although not exclusively to a network in which access is controlled by a AAA server. Instead of defining on the AAA server all possible network devices that may require or provide access, along with the respective services they may need, in the present invention the network devices submit access request messages which include information both identifying the device and also specifying explicitly which services are needed. On receipt of such requests, the AAA server uses its internal policies to confirm or deny access, to select appropriate services from those requested, and to instruct the provisioning of those services. The invention provides additional granularity in authentication/authorization, and also significantly reduces the amount of work required to set up and maintain the AAA server.

25 Claims, 3 Drawing Sheets

| VSA | VId | Subtype | Length | Value |
|---|---|---|---|---|

METHOD FOR A NETWORK DEVICE TO DESCRIBE ITSELF AND THE SERVICES IT REQUIRES TO A AAA SERVER

FIELD OF THE INVENTION

The present invention generally relates to wide area and local area computer networks. The invention relates more specifically to a method and apparatus for requesting access to services across a computer network. The invention finds particular although not exclusive application in a method and apparatus for requesting services from an AAA (Authentication, Authorization and Accounting) server.

BACKGROUND OF THE INVENTION

The technology and techniques described in this section are considered by the patent applicant to be useable in conjunction with the present invention, but they may not necessarily have been previously conceived, pursued and/or published. Therefore, unless otherwise explicitly indicated, nothing described in this section is prior art to the claims in this application. In particular, there is no admission that anything is prior art merely by virtue of its inclusion within this section.

In larger computer networks, the task of granting service access to devices (remote or local) is frequently nowadays controlled centrally, by means of an AAA (Authentication, Authorization and Accounting) server, also known as an Access Control Server. This typically uses a standard protocol known as RADIUS (Remote Access Dial In User Service). An AAA server supporting RADIUS, as its name suggests, typically provides a range of functionality including authentication, service request authorization and also the provision of logon and logoff times and other session data for accounting purposes.

A challenge is that customers naturally desire to control and provision user sessions on network access devices with a common tool and policy framework i.e. a single AAA server infrastructure. This results in the requirement for the AAA server to establish the service being requested by the end user and on which type of network access device (different devices may offer the same service e.g. but require different provisioning for that service). In the RADIUS protocol, however, there is currently no way for the end user or the network access device to indicate what type of device is involved (router, WLAN AP, Ethernet switch, VPN concentrator, firewall etc.), what Operating System and version the device is running or to adequately describe the type of service that is being requested (Dial access, VPN, WLAN access, LAN access, VOIP access, firewall access, etc).

One approach to this problem that has been used in the past is to require network administrators to configure the AAA server with the explicit knowledge of what each network access device (or collections of devices) requires of it. This solution is, however, unacceptable since it increases the burden on the AAA administrator and scalability breaks down at relatively small numbers of devices (eg hundreds of devices). Additionally, this approach only works for single-service devices (eg where a single Service is being provided by a device as described by its IP address).

Present approaches include the capability within AAA servers to define multiple rules to handle service requests, along with the associated IP address maintenance required when large numbers of network devices are in use. While such approaches can be very effective in the hands of skilled network administrators, they do require specialized skills, and it is not always easy in practice to handle complex set-ups in which IP clashes may be expected. There can also be difficulties in dealing with multi service (eg so-called 'multi-blade') devices, for example some firewalls, VPN concentrators and Ethernet switches, where there may be several different devices which all have the same IP address as perceived by the AAA server.

The most modern systems do allow for service provisioning to be provided at some other levels, and not just by IP address. For example, rules can be defined to set one type of service for a VPN, another for a dial-up modem and so on. Within each of these, IP address ranges may be defined. As an example of this, reference may be made to a document entitled "*Cisco Secure Access Control Server for Windows*" which is available at the time of writing as file products_user_guide_chapter09186a0080184955.html#104542 in the folder en/US/products/sw/secursw/ps2086 within the domain www.cisco.com on the World Wide Web; and in particular to the section headed "AAA Client Configuration".

Unfortunately, the ubiquitous RADIUS protocol is inadequate when dealing with this level of complexity. When RADIUS was designed in the early 1990s it was specifically designed, as its name clearly implies, to solve the specific problem of dial-in user access. RADIUS was a single service provided for one type of network access device, a dial up router, to a user. Whilst some capabilities were built into RADIUS to provide some granularity of description of service type (e.g., attribute 6, 'Service-Type'), the options provided by the RADIUS standard are relevant to dial access service control (with the exception of administrative access control that has largely been supplanted in the Cisco sphere by the more suitable TACACS+protocol). In the single-service supported world of dial access, deciding how to provision a user session was generally simple, as even in a multi vendor environment all the access devices were providing an homogeneous service (ie dial up routing). This is not the case today.

One approach, of course, would be to abandon the use of RADIUS entirely, and instead make use of some rather more feature-rich protocol such as TACACS+ or DIAMETER. But those protocols would by no means supply a complete solution and, in any event, the use of RADIUS is currently so widespread and well-understood that there would be substantial practical difficulties in attempting to supplant it entirely within a short to medium timescale.

BRIEF DESCRIPTION OF THE DRAWINGS

The present invention is illustrated by way of example, and not by way of limitation, in the figures of the accompanying drawings and in which like reference numerals refer to similar elements and in which.

DETAILED DESCRIPTION OF THE EMBODIMENT

Figure 1:
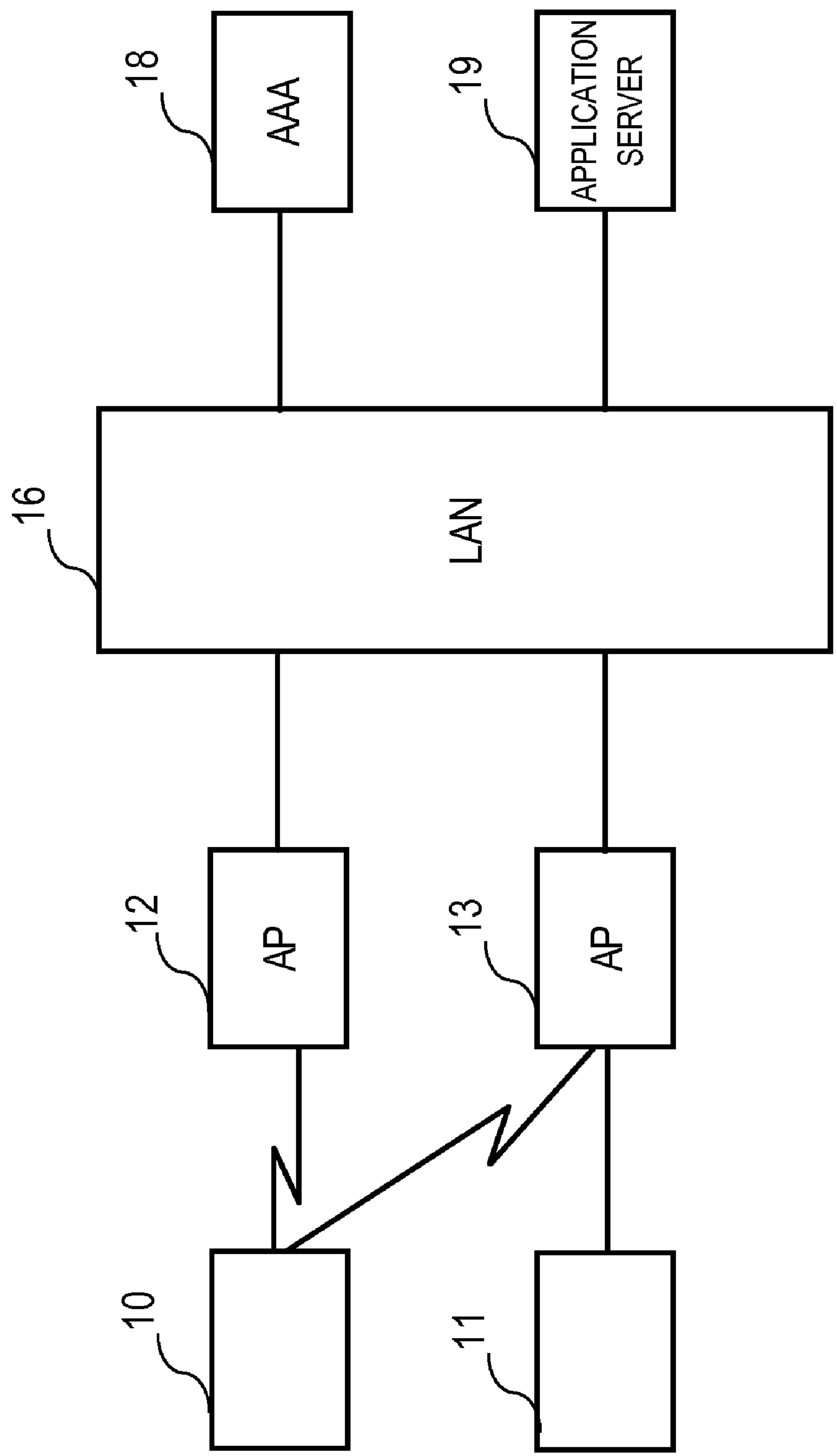
FIG. 1 is a block diagram that illustrates an overview of a computer network suitable for implementing embodiments of the present invention.

A method and apparatus for requesting access to services across a computer network is described. In the following description, for the purposes of explanation, numerous specific details are set forth in order to provide a thorough understanding of the present invention. It will be apparent, however, to one skilled in the art that the present invention may be practised without these specific details. Well-known structures and devices are shown in block diagram form in order to avoid unnecessarily obscuring the present invention.

General Overview

The needs identified in the foregoing Background, and other needs and objects that will become apparent for the following description, are achieved in the present invention, which comprises, in one aspect, a method for requesting access to services across a computer network.

In one embodiment, an end-user device connects to a network access device which requests access to network resources on behalf of the end-user device by generating and forwarding (for authentication and/or authorization) an access request. This access request includes a network access device description and a plurality of service requests indicative of computer services for which the end-user device requires provisioning on the network access device. In one form of the invention, the access request is RADIUS-compliant, with the service requests being defined by information contained within the Vendor Specific Attribute (VSA) blocks within a RADIUS authentication request packet. Alternatively, in other embodiments other, non-RADIUS protocol mechanisms may be used instead. It will, of course, be understood that while the invention is preferably implemented in a network access device which requests services on behalf of other devices or end-users, it is equally well applicable to a network device of any type which requests services for its own use. The requesting device may be a local network device on the Local Area Network (LAN) of the AAA server(s), or it may be remote and connect either via a direct link or via a Wide Area Network (WAN).

The network access device description that is included within the access request may include a variety of different descriptive information including but not limited to the device vendor, device type, device Operating System version and physical location. The service request may also include additional information, for example a request that provisioning be provided for a particular service level (ie an 'importance' attribute)

It is not essential for RADIUS-compliant packets to be used, and any suitably feature-rich protocol could be used instead. However, RADIUS-compliancy has a number of benefits:

The engineering costs are extremely modest

It can be implemented without contravening the RADIUS standard

It has zero impact on RFC compliant 3$^{rd}$ parties

Once received by the network, a network policy is applied to the access request to determine whether access will be provided to the requesting device and, if so, for what services. Likewise, network resources may be provisioned in dependence upon the received access request.

In one embodiment, the access requests are received and processed by a centralized access-control server, for example an AAA server. The AAA server determines the permissible access levels and the services that are to be provided, and may also be empowered to select among the multiple services that are specified for a particular device.

By using this method of requesting services across a computer network, for example by means of the RADIUS protocol, network administrators may be offered improved control and can provision user sessions on network access devices with a common tool and policy framework (for example by means of a single AAA server infrastructure).

Structural and Functional Overview

Turning first to FIG. 1, there is shown a simplified and schematic block diagram of a computer network suitable for use for implementing the present invention. In this example, wireless end-user devices 10 and wired end-user devices 11 require network access to a central applications server 19 on a LAN 16. Physical access to the LAN is provided by one or more respective network access devices—wireless 12 and/or wired 13 Access Points (APs) (also known as AAA clients when acting as clients to an AAA server). Typically, each network access device 12,13 will offer a range of services to one or more of the end-user devices. Logical access to the applications server 19, and indeed to all other parts of the LAN 16 and the services it provides, is controlled by one or more centralized AAA servers 18.

In contrast with known systems, in which the type of network access devices that may provide access, and the services that they may provide, are all predefined in advance on the AAA server, in one embodiment the wireless and wired access points 12, 13 are provided with hardware and/or software which allow them to send access requests on behalf of the end-user devices 10,11 to the AAA server 18 while, at the same time, both describing to the AAA server: (1) the sending devices themselves and (2) the services that they require of the server and/or that they can provide to the end user. The AAA server then processes that information centrally using it both to provide access and authorization decisions, and also to provide any necessary service provisioning (eg services to be set up on the requesting device) that it determines the end-user device should be provided with.

Thus, the AAA server is effectively reconfigured automatically in real time in dependence upon the mix of access devices that are currently attached to the network, and the specific services or combinations of services that are required by those particular devices. Of course, it will be understood that the AAA server still retains overall control, in the sense that it may have rules set up which cause it to deny access to particular types of end-user device, to particular services, or to particular combinations.

With all the necessary information being provided automatically by the requesting access devices, a suitably capable AAA server can determine which type of service the end-user is requesting and provision it in the appropriate way based on the device and OS version. Having this information supplied by the device removes the burden from the AAA administrator of having to accurately associate service(s) with a network device. Thus, this solution provides a way for the AAA server to choose among multiple services that are offered by a single device. Authentication and authorization can be provided in a more granular manner (by service/user) than is at present possible.

As will be described below, in this embodiment the network devices communicate by means of a novel extension to the standard RADIUS protocol. However, that is not essential and in its broadest form the invention is applicable to the use of any communications protocol that can provide the required functionality, including but not limited to Diameter, TACACS+, SAML (Security Assertion Markup Language) and other AAA protocols.

Details of the RADIUS protocol are described in a document entitled "*Remote Authentication Dial In User Service* (*RADIUS*)" which is available at the time of writing as file rfc2865.txt in the folder rfc within the domain www.ietforg on the World Wide Web. RADIUS accounting procedures are described in a document entitled "*RADIUS Accounting*" which is available at the time of writing as file rfc2866.txt in the folder rfc within the domain www.ietf.org on the World Wide Web. TACACS+ is described in a document entitled "*What is TACACS*+ for?" which is available at the time of writing as file tacacsl.html in the folder tacacs/docs within the domain www.gazi.edu.tr on the World Wide Web. The entire contents of each of these documents are incorporated by reference for all purposes as if fully set forth herein.

Requesting Access to Services Across a Computer Network

One method, which makes use of RADIUS packets, will now be described in more detail with reference to FIGS. 2 and 3. As mentioned above, FIG. 2. shows the structure of a typical RADIUS packet, and FIG. 3 illustrates an extension to the RADIUS protocol. In conjunction with RADIUS the invention may, but need not, also use Extendable Authentication Protocol (EAP).

Figure 2:
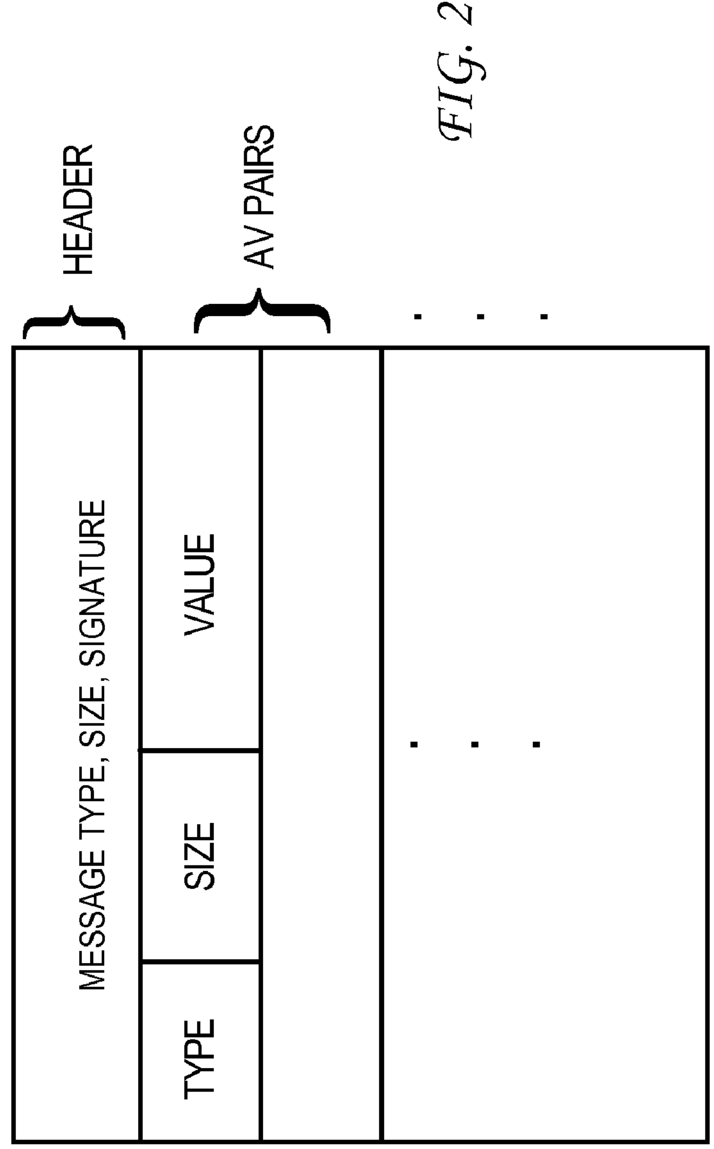
FIG. 2 shows the structure of a typical RADIUS packet.
Figure 3:
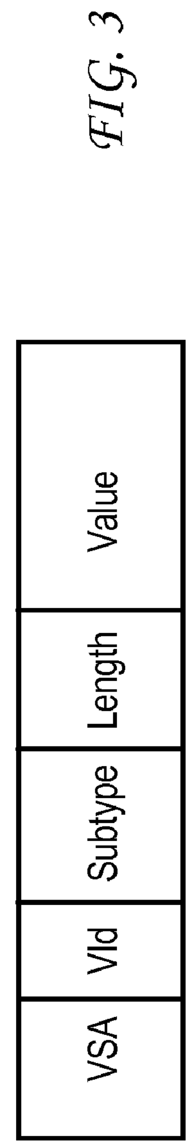
FIG. 3 illustrates an extension to the RADIUS protocol as used in one embodiment.

FIG. 2 shows the internal structure of a typical RADIUS packet: as will be seen, it consists of a header followed by a number of so-called 'AV Pairs' each of which starts with a one byte type-code T, followed by the size, followed by the value. One of the type codes within the RADIUS standard (specifically, number 26) is known as the 'Vendor Specific Attribute' (VSA). When the type code is equal to the VSA, the value or payload may be split up further, as shown more specifically in FIG. 3.

In FIG. 3, VId represents the vendor Id (for example, Cisco is 9) with the subtype, length and value being privately defined by the vendor specified within the VId block. In the present embodiment, VSA=26, VId=9 (for Cisco) and subtype=1 (this being a Cisco-file defined code which specifies that in the value block will be found a string which needs to be parsed to extract the requisite information). So, for example, the value might contain the string 'IP addr=1.2.3.4'.

In one specific implementation, the following new Cisco vendor-specific attributes (VSAs) are introduced into the RADIUS authentication requests from Cisco devices:

| ATTRIB DESCRIPTION | CONTENT | NAME |
|---|---|---|
| Device vendor | Device mfr | dev-vendor |
| Device type | Type of device | dev-type |
| Device version | Device OS version | dev-version |
| Service type | Type of service being requested | service-type |

The attributes are placed in the Cisco-AV-pair VSA and are included in each Access Request packet. Each attribute may be a text string having an arbitrary value, although certain attributes may have a constraint value set. For example, dev-type can be constrained to particular predefined device types and service-type can be constrained to particular service types. The format of the data within the value block takes the form 'protocol:attr=value'. So, a device ddd requiring three different protocols pr1, pr2, pr3 will send the following AV pairs:

| | | | |
|---|---|---|---|
| 26 | 9 | 1 | "prl:dev-type=ddd" |
| 26 | 9 | 1 | "pr2:dev-type=ddd" |
| 26 | 9 | 1 | "pr3:dev-type=ddd" |

Knowledge of what the variables pr1, pr2, pr3 and ddd are is stored in a suitable dictionary, for example in the Windows Registry. In the example above, the device type might for example be 'PIX firewall', 'VPN3K' etc.; the service may be 'WLAN login', 'WLAN re-key', 'VPN login' and so on. Of course, pre-defined codes may be used instead of actual text strings.

The invention is not limited to this type of attribute, and other attributes may easily be added as the need arises. Examples might include building location, owner, service level request importance, or indeed any other attributes that may be necessary or convenient for the AAA server to use as the basis for policy decisions.

Security may typically be provided by conventional encryption techniques, it being preferable that every device should have a different shared secret. The AAA server could then simply look at the request and try a variety of shared keys, one by one, until it finds one that works. The particular service or services requested can then be determined. Alternatively, the present method may operate equally well simply using a single shared key for a group of devices, for example one shared key for each remote office. If the AAA server is set up in an appropriate way, the shared key may be used simply to authenticate individual packets.

Hardware Overview

Figure 4:
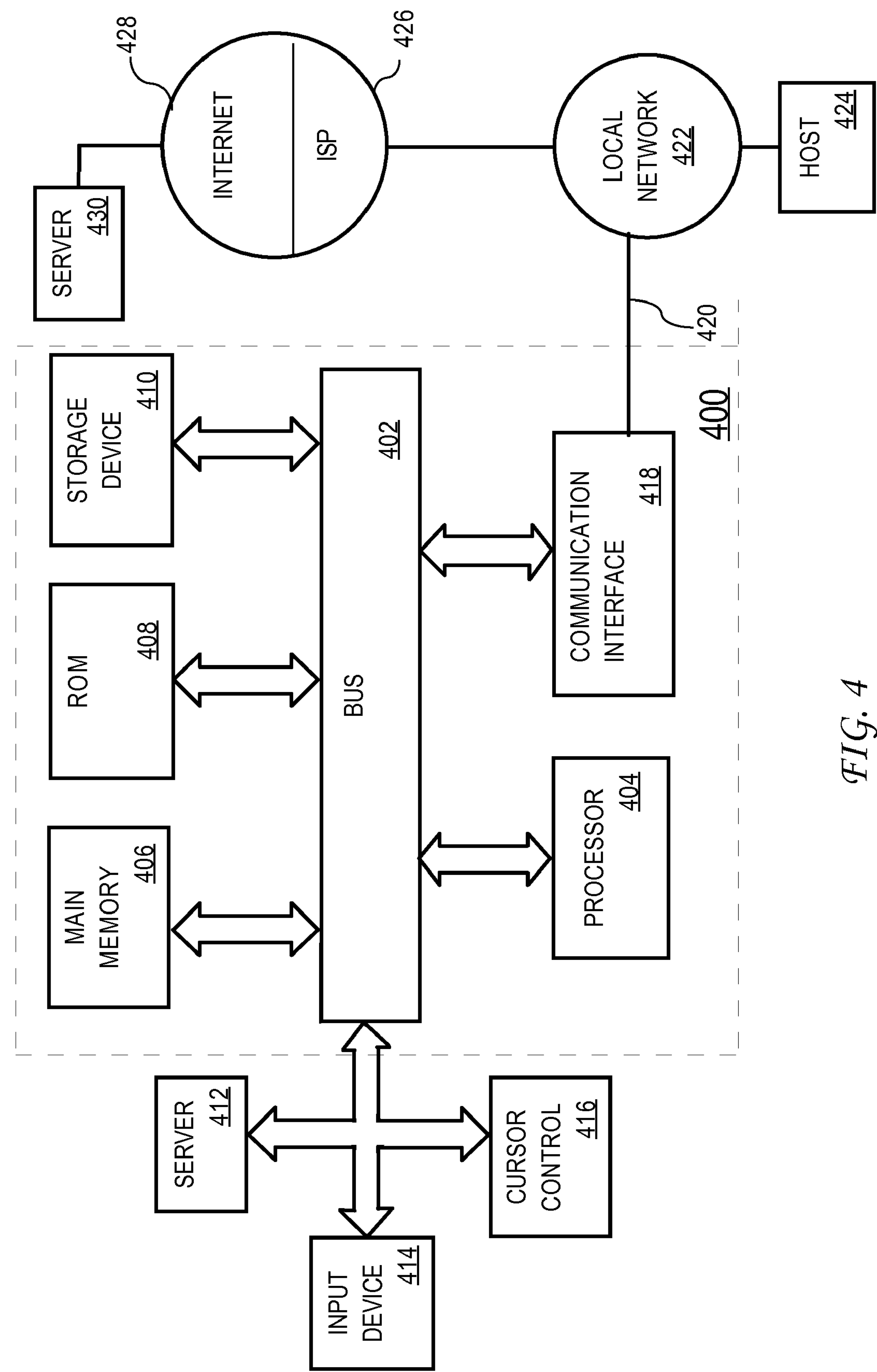
FIG. 4 is a schematic representation of a network device in accordance with an embodiment of the present invention.

FIG. 4 is a block diagram that illustrates a generic network device (for example a network access device or an end-user device) upon which an embodiment of the invention may be implemented. The device may be any computer device requiring or providing access to a network including, but not limited to, a router, firewall, switch, VPN concentrator, desktop or laptop computer, a personal digital assistant (PDA), or a cell phone or other embedded device. Device 100 includes a bus 102 or other communication mechanism for communicating information, and a processor 104 coupled with bus 102 for processing information. Computer system 100 also includes a main memory 106, such as a random access memory ("RAM") or other dynamic storage device, coupled to bus 102 for storing information and instructions to be executed by processor 104. Main memory 106 also may be used for storing temporary variables or other intermediate information during execution of instructions to be executed by processor 104. Device 100 further includes a read only memory ("ROM") 108 or other static storage device coupled to bus 102 for storing static information and instructions for processor 104. A storage device 110, such as a magnetic disk or optical disk, is provided and coupled to bus 102 for storing information and instructions.

Device 100 may be coupled via bus 102 to a display 112 for displaying information to a computer user. An input device 114, including alphanumeric and other keys, is coupled to bus 102 for communicating information and command selections to processor 104. Another type of user input device is cursor control 116, such as a mouse, trackball, stylus, or cursor direction keys for communicating direction information and command selections to processor 104 and for controlling cursor movement on display 112. This input device typically has two degrees of freedom in two axes, a first axis (e.g., x) and a second axis (e.g., y), that allows the device to specify positions in a plane.

The invention is related to the use of Device 100 when requesting access (either on its own behalf or on behalf of one or more end-user devices which could be either local—on the LAN—or remote) to one or more resources/services on a computer network. According to one embodiment of the invention, the access request (for example a RADIUS packet) is generated in response to processor 104 executing one or more sequences of one or more instructions contained in main memory 106. Such instructions may be read into main memory 106 from another computer-readable medium, such as storage device 110. Execution of the sequences of instructions contained in main memory 106 causes processor 104 to perform the process steps described herein. In alternative embodiments, hard-wired circuitry may be used in place of or in combination with software instructions to implement the invention. Thus, embodiments of the invention are not limited to any specific combination of hardware circuitry and software.

The term "computer-readable medium" as used herein refers to any storage medium that participates in providing instructions to processor 104 for execution. Such a medium may take many forms, including but not limited to, non-volatile media, and volatile media. Non-volatile media includes, for example, optical or magnetic disks, such as storage device 110. Volatile media includes dynamic memory, such as main memory 106.

Common forms of computer-readable media include, for example, a floppy disk, a flexible disk, hard disk, magnetic tape, or any other magnetic medium, a CD-ROM, DVD, any other optical medium, punchcards, papertape, any other physical medium with patterns thereon, a RAM, a PROM, and EPROM, a FLASH-EPROM, any other memory chip or cartridge or any other medium from which a computer can read.

Various forms of computer readable media may be involved in carrying one or more sequences of one or more instructions to processor 104 for execution. For example, the instructions may initially be carried on a magnetic disk of a remote computer. The remote computer can load the instructions into its dynamic memory and send the instructions over a telephone line using a modem. A modem local to computer system 100 can receive the data on the telephone line and use an infra-red transmitter to convert the data to an infra-red signal. An infra-red detector can receive the data carried in the infra-red signal and appropriate circuitry can place the data on bus 102. Bus 102 carries the data to main memory 106, from which processor 104 retrieves and executes the instructions. The instructions received by main memory 106 may optionally be stored on storage device 110 either before or after execution by processor 104.

Computer system 100 also includes a communication interface 118 coupled to bus 102. Communication interface 118 provides a two-way data communication coupling to a network link 120 that is connected to a local network 122 (e.g. the LAN 16 of FIG. 1). For example, communication interface 118 may be an integrated services digital network ("ISDN"), a DSL link card or a modem to provide a data communication connection to a corresponding type of telephone line. As another example, communication interface 118 may be a Local Area Network (LAN) card to provide a direct data communication connection to the LAN. Wireless links may also be implemented. In any such implementation, communication interface 118 sends and receives electrical, electromagnetic or optical signals that carry digital data streams representing various types of information.

Network link 120 provides data communication through one or more networks to other data devices. For example, network link 120 provides a connection through the local network 122 to a host computer 124 (e.g. the Application Server 19 of FIG. 1) or to data equipment operated by an Internet Service Provider (ISP) 126. ISP 126 in turn provides data communication services through the Internet 128. Local network 122 and Internet 128 both use electrical, electromagnetic or optical signals that carry digital data streams. The signals through the various networks and the signals on network link 120 and through communication interface 118, which carry the digital data to and from computer system 100, are exemplary forms of carrier waves transporting the information.

Computer system 100 can send messages including access requests through the network(s), network link 120 and communication interface 118.

Extensions and Alternatives

In the foregoing specification, the invention has been described with reference to specific embodiments thereof. It will, however, be evident that various modifications and changes may be made thereto without departing from the broader spirit and scope of the invention. The specification and drawings are, accordingly, to be regarded in an illustrative rather than a restrictive sense.

What is claimed is:

1. A method of providing access to services across a computer network, comprising the step of:

generating an authentication, authorization and access request by a requesting network access device through which, upon a successful authentication and authorization of an end user device to the computer network, the end user device can obtain access to network resources, said authentication, authorization and access request comprising a requesting network access device description and a plurality of service requests indicative of computer services for which the requesting network access device requests provisioning;

wherein the authentication, authorization and access request is a RADIUS packet;

forwarding, to an authentication, authorization and access-control server, said authentication, authorization and access request for authentication and authorization of the end user device to the computer network, and for reconfiguring the authentication, authorization and access-control server by storing a dependence between the authentication, authorization and access request and the requesting network access device;

wherein the authentication, authorization and access-control server is automatically reconfigured in real time based on the forwarded authentication, authorization and access request and one or more of the requests from one or more other access devices that are attached to the computer network and services that are required by the one or more other access devices;

wherein the method is performed by one or more processors.

2. A method according to claim 1 in which the service requests are defined by information contained within Vendor Specific Attribute (VSA) blocks in the said packet.

3. A method according to claim 2 in which each said block contains a requesting network access device-type identifier and a service-request identifier.

4. A method according to claim 2 in which the packet is a RADIUS-compliant authentication request packet.

5. A method according to claim 1 in which the service requests include a request for a particular service level.

6. A method according to claim 1 in which a policy is applied to the access request to determine whether access will be allowed, and if so for what services.

7. A method according to claim 1 in which said network resources are provisioned in dependence upon the access request.

8. A method according to claim 1 in which the steps of receiving and applying are performed by an access-control server or an Authentication, Authorization and Audit (AAA) server.

9. A method according to claim 8 in which the access-control server uses the access request to select among multiple services that are specified for a particular device.

10. A network device, comprising:

one or more processors;

a network interface capable of being coupled to a requesting network access device and a computer network and for sending access requests to the network; and a computer-readable storage medium having one or more stored sequences of instructions which, when executed, cause the processor to perform the steps of:

generating an authentication, authorization and access request by the requesting network access device through which, upon a successful authentication and authorization of an end user device to the computer network, the end user device can obtain access to network resources, said authentication, authorization and access request comprising a requesting network access device description and a plurality of service requests indicative of computer services for which the requesting network access device requests provisioning;

wherein the authentication, authorization and access-control server, said request is a RADIUS packet;

forwarding, to an authentication, authorization and access-control server, said authentication, authorization and access request for authentication and authorization of the end user device to the computer network, and for reconfiguring the authentication, authorization and access-control server by storing a dependence between the authentication, authorization and access request and the requesting network access device;

wherein the authentication, authorization and access-control server is automatically reconfigured in real time based on the forwarded authentication, authorization and access request and one or more of the requests from one or more other access devices that are attached to the computer network and services that are required by the one or more other access devices.

11. A network device according to claim 10 in which the service requests are defined by information contained within Vendor Specific Attribute (VSA) blocks in this said packet.

12. A network device according to claim 11 in which each said block contains a requesting network access device-type identifier and a service-request identifier.

13. A network device according to claim 11 in which the packet is a RADIUS-compliant authentication request packet.

14. A network device according to claim 10 in which the service requests include a request for a particular service level.

15. A network device as claimed in claim 10 comprising a requesting network access device which controls end-user device access to a network, and which requests services on behalf of one or more said end-user devices.

16. A network device as claimed in claim 10 in which said requesting network access device requests services for its own use.

17. A computer system comprising an access-control server for controlling access to resources on the network when requested by requesting network access devices, the access-control server being arranged:

(a) to receive an authentication, authorization and access request by a requesting network access device through which, upon a successful authentication and authorization of an end user device to the computer network, the end user device can obtain access to network resources, said authentication, authorization and access request comprising a requesting network access device description and a plurality of service requests indicative of computer services for which the requesting network access device requests provisioning;

wherein the authentication, authorization and access request is a RADIUS packet;

(b) to apply a policy to the authentication, authorization and access request to determine whether the end user device can access the computer network, and if so for what services;

(c) to reconfigure the access control server by storing a dependence between the authentication, authorization and access request and the requesting network access device; wherein the authentication, authorization and access-control server is automatically reconfigured in real time based on the forwarded authentication, authorization and access request and one or more of the requests from one or more other access devices that are attached to the computer network and services that are required by the one or more other access devices.

18. A computer system according to claim 17 in which the access control server instructs the provisioning of network resources in dependence upon the access request.

19. A computer system according to claim 17 in which the access-control server is an Authentication, Authorization and Audit (AAA) server.

20. A computer system according to claim 17 in which the access-control server uses the access request to select among multiple services that are specified for a particular device.

21. A computer-readable non-transitory storage medium storing a sequence of instructions which, when executed by one or more processors, cause said processor or processors to perform the steps of:

generating an authentication, authorization and access request by a requesting network access device through which, upon a successful authentication and authorization of an end user device to the computer network, the end user device can obtain access to network resources, said authentication, authorization and access comprising a requesting network access device description and a plurality of service requests indicative of computer services for which the requesting network access device requests provisioning;

wherein the authentication, authorization and access request is a RADIUS packet;

forwarding, to an authentication, authorization and access-control server, said authentication, authorization and access request for authentication and authorization of the end user device to the computer network, and for reconfiguring the authentication, authorization and access-control server by storing a dependence between the authentication, authorization and access request and the requesting network access device;

wherein the authentication, authorization and access-control server is automatically reconfigured in real time based on the forwarded authentication, authorization and access request and one or more of the requests from one or more other access devices that are attached to the computer network and services that are required by the one or more other access devices.

22. A computer-readable storage medium according to claim 21 in which the service requests are defined by information contained within Vendor Specific Attribute (VSA) blocks in said packet.

23. A computer-readable storage medium according to claim 22 further including instructions for creating within each said block a requesting network access device-type identifier and a service-request identifier.

24. A computer-readable storage medium according to claim 22 in which the generated packet is a RADIUS-compliant authentication request packet.

25. A computer-readable storage medium according to claim 21, in which service requests include a request for a particular service level.

* * * * *